United States Patent

Rosenbeck

[11] 3,940,823
[45] Mar. 2, 1976

[54] END CLIP FOR BLADE REFILLS
[75] Inventor: Gary L. Rosenbeck, St. Charles, Ill.
[73] Assignee: The Anderson Company, Gary, Indiana
[22] Filed: Mar. 30, 1973
[21] Appl. No.: 346,356

[52] U.S. Cl. .................................... 15/250.42
[51] Int. Cl. ..................... B60s 1/02; B60s 1/38
[58] Field of Search ................ 15/250.36, 250.42

[56] References Cited
UNITED STATES PATENTS

| | | | |
|---|---|---|---|
| 2,983,945 | 5/1961 | De Pew | 15/250.42 |
| 3,153,254 | 10/1964 | Lenz et al. | 15/250.42 |
| 3,626,544 | 12/1971 | Lopez et al. | 15/250.42 |
| 3,769,653 | 11/1973 | Lopez | 15/250.42 |

Primary Examiner—Peter Feldman
Attorney, Agent, or Firm—Wegner, Stellman, McCord, Wiles & Wood

[57] ABSTRACT

An end clip positively secured to the end of a backing strip of a windshield wiper blade refill unit by means of a projection at the end of the backing strip extending from one side thereof through a slot in the end clip to prevent relative longitudinal motion between the end clip and the backing strip, together with ear members extending inwardly from finger engaging upturned tabs on the outer edges of the end clip toward the center of the end clip overlying the other side of the backing strip for restraining relative motion between the end clip and the backing strip in a direction normal to the elongate axis of the backing strip.

9 Claims, 8 Drawing Figures

U.S. Patent  March 2, 1976  3,940,823
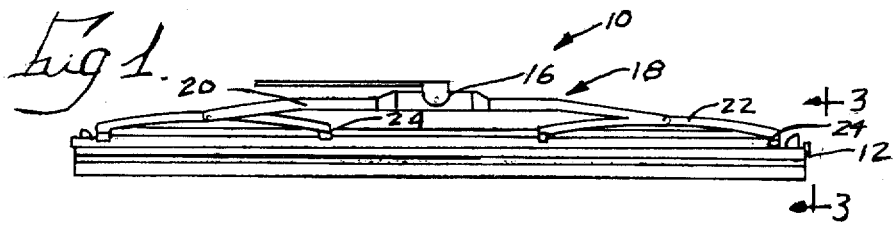
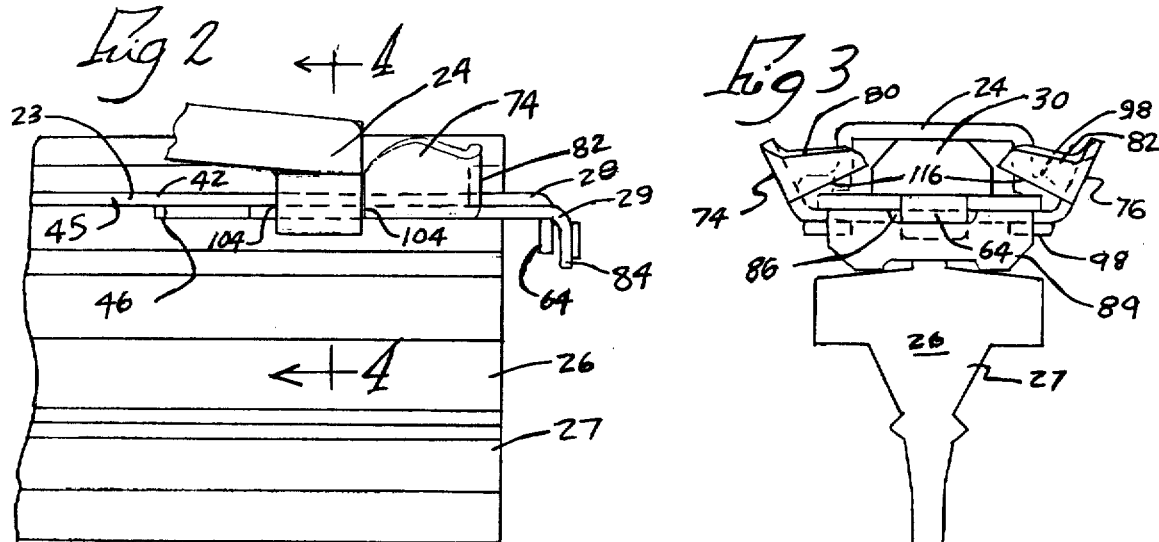
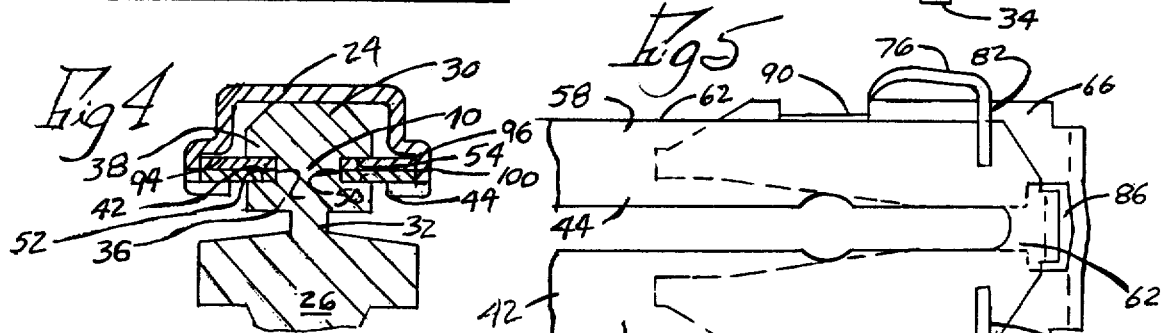
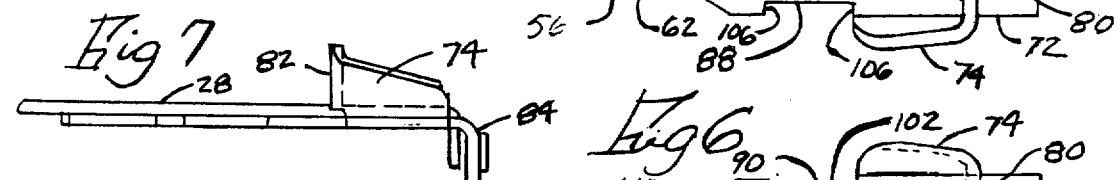
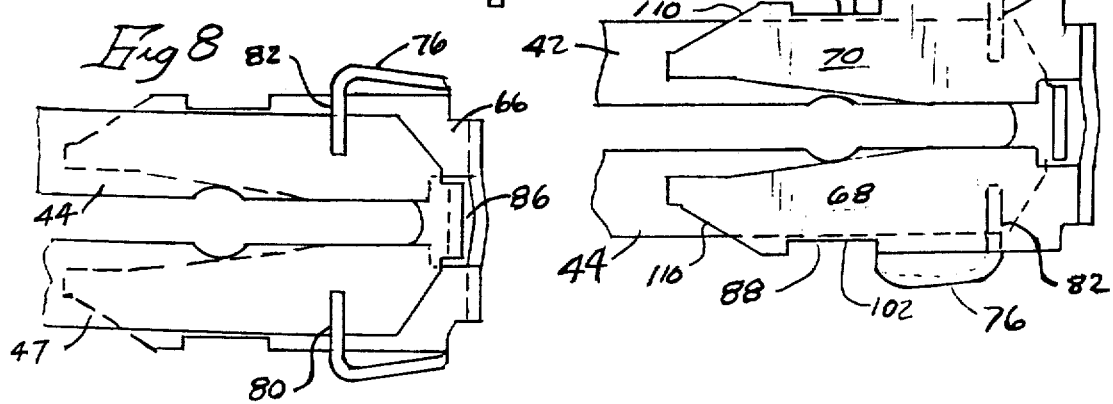

END CLIP FOR BLADE REFILLS

BACKGROUND OF THE INVENTION

This invention relates generally to windshield wiper blade refill units of the type having a wiper element, a flexible backing strip having legs seated in grooves on either side of the wiper element and an end clip secured to one end of the backing strip for releasable connection with a supporting structure of a wiper blade assembly, and, particularly, to an arrangement for securing together the end clip and the backing strip of the refill unit.

A windshield wiper blade assembly typically comprises a blade refill unit releasably secured to a pressure distributing supporting structure which, in turn, is secured to the free end of a pivotally mounted arm assembly. When the wiper element of the blade refill unit becomes worn, it is desirable for the old refill unit to be easily disconnected from the supporting structure and replaced with a new refill unit.

To facilitate easy connection and disconnection of the refill unit and the supporting structure, end clips have been used which are secured to the backing strip and releasably engage with the claws of the supporting structure. These end clips comprise a planar body portion with two spaced arms extending therefrom which overlie the two legs of the backing strip and are seated therewith in grooves along both sides of the head of the wiper element. The arms have notches in their outer edges which resiliently engage the claws of the supporting structure and are released from engagement with the claws for removal of the refill units when the arms are squeezed together. To facilitate the squeezing by a person's fingers, the arms are often provided with tabs extending upwardly from the outer edges of the arms.

A troublesome problem of the refill units having end clips of the type described above lies in the manner in which the end clip and backing strip are secured together. Some current designs of end clips have projections at the end of the end clip extending through a slot in the backing strip to prevent relative longitudinal movement therebetween and the restraining action of the side walls of the grooves in the wiper element in which the two arms of the end clip are seated is relied upon to prevent relative motion in a direction normal to the longitudinal axis of the backing strip. When the arms of the end clip are engaged by the claws of the supporting structure, they are squeezed inwardly towards each other and fit snugly within the grooves. In this condition the restraining action of the grooves together with that of the claws of the supporting structure are generally sufficient to prevent the end clip from moving in a direction normal to the elongate axis of the backing strip and thereby becoming disengaged at its slot from the projection at the end of the backing strip.

However, when the refill unit is not secured to the supporting structure, and the end clip is in an unsqueezed condition, the arms of the end clip are sufficiently spaced that one or the other or both may move out of the grooves in the wiper element thereby permitting separation of the end clip and the backing strip where they are secured at their respective slot and projection. If the separation is great enough, the end clip may become totally separated from the backing strip and become lost.

Such separation of the end clip from the remaining portion of the refill unit may occur because of handling during the packaging of the refill unit such that incomplete and unusable refill units may be sold resulting in considerable consumer dissatisfaction. Further, when a plurality of such refill units are packaged together in a single container, dropping of the container has been known to result in separation of almost all of the end clips which, of course, requires considerable time to reassemble.

SUMMARY OF THE INVENTION

The separation problem described above is eliminated in the end clip and end clip securing arrangement of the invention in a unique and inexpensive manner. In accordance with the present invention, ears are formed at the ends of the tabs which ears extend inwardly toward the center of the end clip so as to overlie the edge portions of the backing strip. That is, the backing strip is slideably interposed between the inwardly extending ears and the top surface of the arms of the backing strip, and relative motion therebetween in a direction normal to the longitudinal axis of the backing strip is prevented. This, in combination with the slot and projection mating means preventing relative longitudinal motion between the end clip and the backing strip, provides a securing arrangement which absolutely prevents separation of the end clip and the backing strip despite the roughest handling during packaging or shipping of the refill units.

BRIEF DESCRIPTION OF THE DRAWINGS

These and further features and advantages of the end clip and end clip securing arrangement of the present invention will be made more apparent in the following description of the preferred embodiment taken together with the drawings in which:

FIG. 1 is a side view of a portion of a wiper arm assembly connected to a pressure distributing supporting structure which, in turn, has secured thereto a windshield wiper refill unit having a preferred embodiment of the end clip securing arrangement of the present invention;

FIG. 2 is a side view of an enlarged portion of the end of the windshield wiper assembly of FIG. 1 carrying the end clip showing the claw connector of the supporting structure and the wiper element, backing strip and end clip of the refill unit;

FIG. 3 is an enlarged view of the end of the windshield wiper assembly of FIG. 1;

FIG. 4 is a sectional view taken substantially along the section lines 4—4 of FIG. 2;

FIG. 5 is a plan view of the top of a preferred embodiment of the end clip connected with a backing strip;

FIG. 6 is a plan view of the bottom of a preferred embodiment of the end clip connected with a backing strip;

FIG. 7 is a side view of another form of the preferred embodiment of the end clip connected with a backing strip; and, FIG. 8 is a top view of the end clip and backing strip of FIG. 7.

DESCRIPTION OF THE PREFERRED EMBODIMENT

The windshield wiper blade assembly, generally designated by reference numeral 10, shown in FIG. 1 in addition to having a wiper blade refill unit, generally designated by reference numeral 12, in which the improved end clip securing arrangement of the present invention is utilized, includes a wiper arm assembly 11, the free end portion of which is designated by reference numeral 14, to which is pivotally connected, by means of a connector 16 or the like, a superstructure or pressure distributing supporting structure, generally designated by reference numeral 18. Supporting structure 18 comprises a primary yoke 20 to each end of which is articulated a secondary yoke 22 which, in turn, is slideably connected by means of claws 24 to the wiper blade refill unit 12. Other forms of superstructures with different articulated members are adapted for use with the refill of the present invention.

As best seen in FIGS. 2, 3 and 4, refill unit 12 includes a wiper element 26, an elongate backing strip 28 and connected thereto at at least one end of the refill unit, an end clip 29. As best seen in FIGS. 3 and 4, resilient wiper element 26 is composed of a wiping portion 27 and an attaching or back portion 30 which are joined together by an intermediate hinge portion 32 such that the wiping portion may move laterally with respect to the back portion when the blade is moved back and forth across a windshield. The wiping portion 27 is tapered gradually downwardly to a surface-contacting wiping edge 34 adapted to contact a windshield for cleaning the surface thereof.

Back portion 30 of wiper element 26 comprises a lower section 36 and an upper section 38 joined together by a reduced portion 40 so as to form a pair of matching grooves 42 and 44 in the opposite sides thereof extending the full length of the back portion. As best seen in FIGS. 2 and 4, grooves 42 and 44 have enlarged sections 46 near the end of wiper element 26 to accommodate receipt of both the backing strip 28 and end clip 29 and a narrower section 48 extending the remaining length of wiper element 26 to accommodate backing strip 28 alone. As seen in FIG. 4, each of the grooves 42 and 44 has a base wall 50 spaced an equal amount from the opposite sides of the longitudinal center line of the blade. Each base wall 50 is bounded by spaced side wall 52 and 54.

Elongate flexible backing strip 28, the end portion of which is best shown in FIGS. 2, 3, 5 and 6 is comprised of two spaced, parallel, elongate, planar leg members 56 and 58 extending from and between two connecting portions 60 at opposite ends thereof. Leg members 56 and 58 which are adapted to be resilient or flexible in directions perpendicular to the plane in which they lie and inflexible in their plane, are seated within grooves 42 and 44, respectively, and are of such a dimension that their outer edges 62 are positioned beyond the edge portions of upper sections 38 of back portion 30 so that they are accessible by claw connectors 24 of the superstructure. The backing strip 28 also includes a projection member 64 downturned from connecting portion 60 extending in a direction substantially normal to the plane of leg members 56 and 58. This projection member 64 is adapted to extend through a projection member receiving slot in the end clip for securing it thereto as will be explained in more detail hereinafter.

Turning now to FIGS. 3, 4, 5 and 6, the end clip 29 comprises a planar body portion 66 with two spaced elongate arms 68 and 70 extending therefrom and when assembled with the backing strip, will be juxtaposed with the bottom surfaces of legs 42 and 44, respectively, of the backing strip. Formed at the outer edges 72 of arms 68 and 70 are tab members 74 and 76, respectively, which extend upwardly and, when assembled with the backing strip will extend beyond the upper surfaces of legs 42 and 44 of the backing strip. Ear members 80 and 82 are formed on the tabs 74 and 76 and extend inwardly toward the center of the clip and overlie top surfaces of arms 68,70 of the clip and, when assembled with the backing strip 28, will overlie the top surfaces of legs 56 and 58, respectively, of the backing strip. At the one end of the body portion 66 of end clip 29 is a downturned end projection 84, and formed inwardly therefrom and adjacent thereto is a slot 86 adapted to receive projection 64 of the backing strip. Formed at the outer edges of arms 68 and 70, adjacent the tab members, are notches 88 and 90 adapted to receive the claws 24 of the superstructure.

Claws 24, which engage the end clip and backing strip at one end of the wiper blade and which engage only the backing strip at the other end and points intermediate therebetween may be embodied in various shapes, but includes in all instances a pair of channels 94 and 96, one formed in each side of the component of the superstructure and within which claws are slideably seated arm 68 and leg 58 and arm 70 and leg 56, respectively.

The claws are formed with parallel top and bottom walls 98 joined together by outboard walls 100 and are spaced sufficiently to slideably receive therebetween the arms of the end clip and legs of the backing strip. The spaced claws 24 on the outboard end of the yoke are seated within notches 88 and 90, respectively, with the longitudinal edges 106 of the notches serving to limit the longitudinal movement between the claws 24 and the end clip 29.

The inboard end portion of side edges 72 of the arms 68, 70 of the end clip 29 each have a tapered portion 110 extending inwardly from adjacent the notches toward the center and end of each arm. The claws 24 are engaged, and hence the superstructure is engaged, with the end clip by sliding the claws along the legs of the backing strip onto the tapered portions 110 which are cammingly engaged by the inside of the outboard walls 100 of the claws to squeeze together the arms 68, 70 of the end clip. The claws ride over the tapered portion squeezing the legs together, until the claws completely pass the side wall of the notch adjacent the end of the arm at which time the arms of the clip resiliently return to the unsqueezed position with the claws 24 trapped in the notches 88, 90 to thereby secure the superstructure 18 to the wiper blade refill.

To remove the superstructure from the refill, the tab members 74, 76 on the arms of the end clip must be squeezed together so that the claws 24 can override the edges of the notches 88, 90 in the arms of the end clip and to facilitate this squeezing process, tabs 74 and 76 are provided. The tab members 74, 76 are planar and are bent upwardly from the plane of the body portion and arms of the end clip at an acute angle with respect thereto and are of sufficient dimension that they extend beyond the top surface of the backing strip. Bent inwardly at either end of the tab members are ear members 80 and 82. The ear members are also planar and are preferably bent at an angle of 90° with respect to the plane of their associated tab member. The ear members have bottom edges 116 (FIG. 3) which are preferably straight and overlie the top surface of the legs 56, 58 of the backing strip. The portions of the bottom edges 116 which engage the edges of the legs of the backing strip if moved in a lateral direction are of a sufficient distance apart that the engagement with the legs of the backing strip does not prevent the arms 68, 70 of the end clip from being squeezed together to connect or disconnect the claws 24. That is, the distance between the engagement portions of the two ear members 80, 82 is greater than the width dimension of the backing strip 28, as best shown in FIG. 3. The ear members 80, 82 may be formed at the outboard end of the tabs 74, 76 adjacent the body portion 66 of the end clip 29 as shown in FIGS. 3, 5 and 6 or they may be formed at the inboard ends of the tabs 74, 76 adjacent the claw engaging notches 88, 90 of the legs as shown in FIGS. 7 and 8.

The end clip 29 and backing strip 28 are secured together by two latching arrangements, the first latching arrangement having projection 64 of the backing strip extending downwardly through slot 86 of the end clip and thereby limiting relative longitudinal motion between the end clip and the backing strip. The second latching arrangement having ear members 80, 82 on the tabs 74, 76 which ears overlie the legs 56, 58 of the backing strip to prevent the backing strip and end clip separating in a direction normal to the elongate direction of the backing strip thereby preventing the projection member 64 of the backing strip becoming disengaged from the slot 86 of the end clip. The mating connection of projection 64 and slot 86 prevents relative longitudinal movement between the end clip and backing strip and precludes the end clip from sliding off the end of the backing strip.

Thus, the combined mating connection between the projection member and slot together with the ear members overlying the legs of the backing strip positively prevents the end clip from becoming disengaged from the backing strip, and thus the aforementioned problems associated therewith are eliminated.

I claim:

1. In a windshield wiper blade refill unit having a backing strip with two spaced elongate parallel legs, a wiper blade having a pair of oppositely facing grooves formed therein, the legs of said backing strip nesting in said grooves, an end clip secured to one end portion of the backing strip, said end clip having a body portion with spaced arms extending therefrom and lying in face-to-face relationship with the lower surface of the legs of the backing strip, each of said arms having a portion adapted to be releasably engaged by claws of the superstructure and having aligned upturned tabs on the outer edge portions of the arms of said end clip adapted to be squeezed together to release the arms from engagement by the claws of the superstructure, means for positively securing the end clip and the backing strip together, said means comprising first and second latching means, said first latching means including a projection formed on the end of said backing strip which projection engages in a slot formed in the body portion of said end clip to secure the end clip from longitudinal movement relative to the backing strip, and said second latching means including a pair of inwardly projecting ears formed on the upturned tabs so as to overlie the edges of the backing strip to restrain movement of the end clip normal to the plane of the backing strip.

2. The windshield wiper blade refill unit of claim 1 in which said tabs have an end adjacent the body portion of the end clip and said ear members are formed at said end.

3. The windshield wiper blade refill unit of claim 1 in which each tab has an end adjacent the claw engaging portion of the arms of the end clip and said ear members are formed at said end.

4. The windshield wiper blade refill unit of claim 1 in which both said tabs and said ear members are substantially planar, and said ear members are in a plane substantially perpendicular to and overlie the plane of the backing strip.

5. The windshield wiper blade refill unit of claim 1 in which said arms of the end clip are substantially in a single plane and said tabs are upturned at an acute angle with respect thereto.

6. The windshield wiper blade refill unit of claim 1 in which the backing strip is interposed across the width dimension thereof between inside edges of the ear members and engageable with portions thereof, the distance between the engagement portions of the ear members being greater than the width dimension of the backing strip to permit the arms of the end clip to be squeezed together for releasing the arms from engagement by the claws of the superstructure.

7. The windshield wiper blade refill unit of claim 6 wherein said inward projecting end portions of the arms of the end clip have tapered shoulders and cut out sections facing laterally from the center line of the end clip such that claws of the superstructure will ride up the tapered shoulders to depress the arms toward each other until said claws line up with said cut out sections whereupon the resilience of the blade will force the arms outward to seat the claws and superstructure in retained relation with said blade.

8. In a windshield wiper blade refill unit having a backing strip with two spaced elongate parallel legs, a wiper blade having a pair of oppositely facing grooves formed therein, the legs of said backing strip nesting in said grooves, and end clip secured to one end portion of the backing strip, said end clip having a body portion with spaced arms extending therefrom and lying in face-to-face relationship with the under surface of the legs of the backing strip, each of said arms having a portion adapted to be releasably engaged by claws of a superstructure and having aligned upturned tabs integrally formed on the outer edges of the arms of said end clip and adapted to be squeezed together to release the arms from engagement by the claws of the superstructure, means at the outer end of the backing strip cooperating with the body of the end clip for restraining relative longitudinal movement therebetween; and ear members integrally formed on said tabs and projecting inwardly toward each other and toward the center of the end clip and overlying the top surface of the legs of the backing strip to restrain the end clip and the backing strip from relative movement in a direction normal to the plane of the backing strip.

9. The wiper blade refill unit of claim 8 in which said means for restraining relative longitudinal movement between the end clip and backing strip comprises first and second mating portions respectively associated with the end portion of the backing strip and the body of the end clip, said first mating portion including a projection on the backing strip and said second mating portion being a receiving slot in the end clip said first and second mating portions engage each other to limit relative longitudinal movement between the backing strip and the end clip, and said ear members restraining relative movement in a direction normal to the plane of the backing strip preventing said first and second mating portions from becoming disengaged.

\* \* \* \* \*